Dec. 16, 1924.  1,519,337
O. SCHLAUPITZ
CHUCK OPERATING MECHANISM
Filed Jan. 29, 1923   2 Sheets-Sheet 2
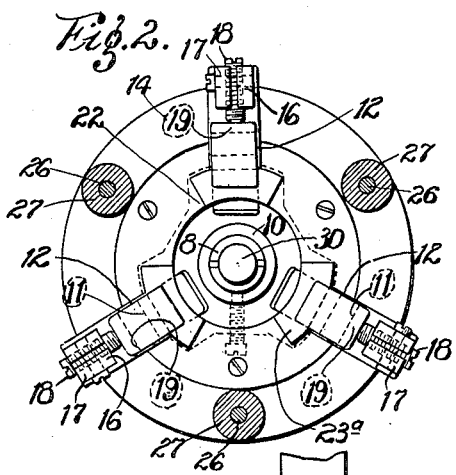
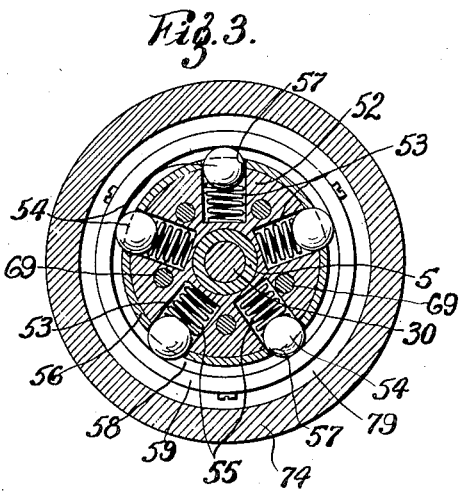
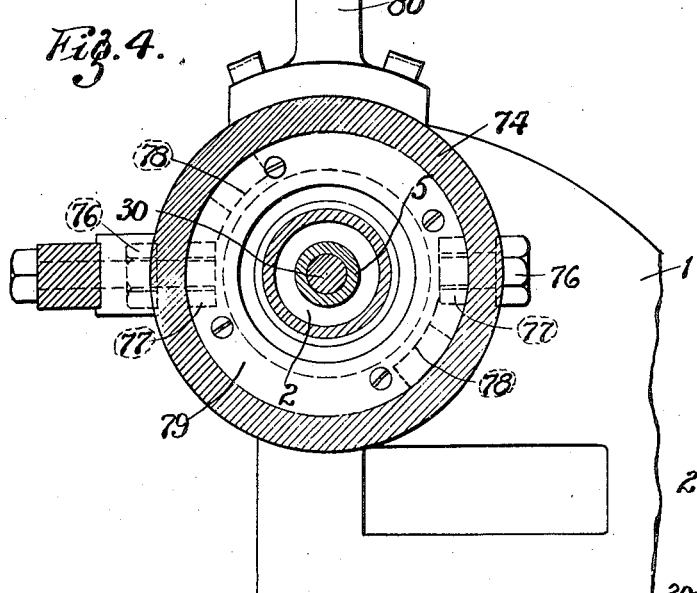
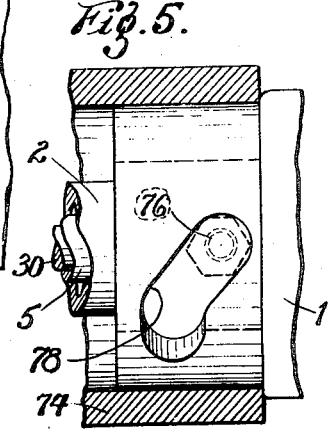

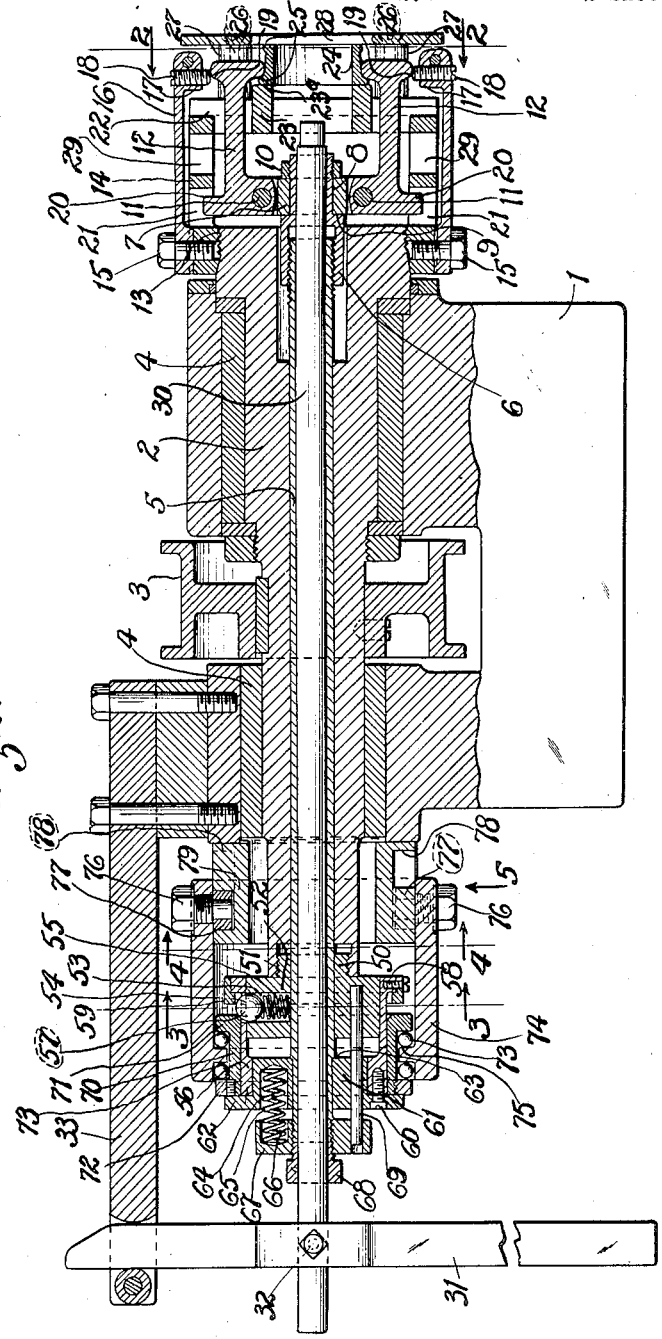

Patented Dec. 16, 1924.

1,519,337

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

CHUCK-OPERATING MECHANISM.

Application filed January 29, 1923. Serial No. 615,549.

*To all whom it may concern:*

Be it known that I, OSWALD SCHLAUPITZ, a citizen of the United States, and a resident of the city of Canton, in the county of Stark and State of Ohio, have invented a new and useful Improvement in Chuck-Operating Mechanism, of which the following is a specification.

My invention relates to chuck operating mechanism, particularly to devices intended for holding roller bearing cones or other annular articles to be ground. The principal objects of the invention are to devise an operating mechanism for chucks that can open and close the chuck while it is being rotated and that will lock the chuck in both positions.

The invention consists principally in the parts and combinations of parts hereinafter described and claimed.

In the accompanying drawing,

Fig. 1 is a longitudinal horizontal sectional view of a chuck and operating mechanism therefor embodying my invention, Fig. 2 is an end view of a chuck with the guard plate therefor removed and taken on the line 2—2 in Fig. 1.

Fig. 3 is a cross-sectional view on the line 3—3 in Fig. 1,

Fig. 4 is a cross-sectional view on the line 4—4 in Fig. 1 and,

Fig. 5 is a fragmentary elevation of the cam mechanism for the operating sleeve of the operating mechanism.

Rotatably mounted in a suitable frame 1 of a grinding machine or the like is a hollow spindle 2 which may conveniently be provided with a pulley-wheel 3 for rotating it. Suitable bushings 4 are provided for the spindle.

Mounted in the spindle 2 and movable longitudinally thereof is a draw-rod 5 for operating the chuck. Preferably said rod 5 has a tubular extension 6 projecting from the end thereof on which is mounted an annular supporting member 7. Preferably the extension 6 of the operating rod 5 is provided with a reduced portion 8, thus providing a shoulder 9 against which the annular supporting member 7 abuts and is held by a nut 10 mounted on the end of the extension of the operating rod. Pivotally secured in slots in the annular supporting member 7 as by pins 11 are work engaging fingers 12. Secured at the end of said spindle 2 as by means of an interiorly threaded portion 13 cooperating with threads at the end of said spindle 2 is a hollow shell 14 that projects beyond the end of the spindle. Secured to the base of said shell 14 as by screws 15 are a plurality of arms 16 that are preferably made of spring metal. Said arms 16 extend beyond the outer end of the shell 14 and are provided with projections 17 that extend radially inward of the shell. Preferably said projections have adjustable contact members 18, as screws, mounted therein.

Each of the work engaging fingers 12 is provided at its outer end with a projection or cam portion 19 that is adapted to be engaged by the contact screw 18 of a spring arm 16, so that the said finger may be moved inward of the chuck. At its other end, each work engaging finger is provided with a projecting portion 20 that rides in a slot 21 in the hollow shell. By this arrangement, the fingers 12 and hence the operating rod 5 rotate with the spindle 2. When the operating rod 5 is moved in one direction, the projection 20 of each finger 12 strikes the wall of the shell at the end of a slot 21, thus swinging the outer ends of the fingers outward of the chuck, and releasing an article held in the chuck.

Secured to the end of the hollow shell 14 is an annular plate 22 and secured to said annular plate is an abutment plate 23 for the work 24, which in the drawing is shown as a roller bearing cone having a rib 25 at each end. The abutment plate preferably has a plurality of raised portions 23ᵃ that are accurately finished to form the work seat. Secured to the annular plate 23 as by screws 26, and spaced away therefrom as by plugs 27 in an annular guard 28.

The operation of the chuck is as follows:
In the construction shown in Fig. 1, the roller bearing cone 24 is held in position in the chuck by the work engaging fingers 12. The fingers 12 press against the bearing surface of the cone 24 but principally their pressure is against the rib 25 at the larger end of the cone. When the cone has been ground out, the operating rod 5 is moved to the right, and when the projections 20 at the end of the fingers 12 reach the end of the slots 21 in the hollow shell 14, the outer ends of the fingers are swung clear of the work, which may then be removed, while the chuck is still rotating, and a new cone inserted. The operating rod 5 is then moved to the left, and the projections 19 at the outer ends of the fingers 12 strike against the adjusting screws 18 of the spring arms 16 and are forced against the cone. Any slight variation of the cone from the standard size is compensated for by the yieldability of the spring arms 16. The slots 21 in the shell and other slots 29 that may be provided permit the escape from the chuck of dirt and the water or other liquid with which the work is ordinarily sprayed during the grinding operation.

It is customary to test the bore of the cone by inserting a plug gage therein. This plug gage is sometimes difficult to remove. According to my invention a rod 30 is mounted in the operating rod 5 so as to be movable longitudinally thereof, and constitute a knockout for a plug gage. Said knockout rod 30 is provided with a suitable operating handle 31, with which it has a pivotal connection as by means of a bolt 32. The operating handle 31 is secured to a suitable member 33 of the frame 1 of the grinding machine.

Any suitable mechanism may be provided for operating the chuck. A preferred form is shown in the drawings.

Secured to the spindle 2 as by means of a threaded portion 50 cooperating with a threaded portion 51 of the bore of the spindle is an annulus 52 whose periphery is provided with a plurality of radially extending recesses 53. In each recess is disposed a ball 54 and between the ball and the end of the recess 53 is a coil spring 55 that tends to push the ball out of the recess. Slidable over on the ball retaining annulus 52 is a sleeve 56 that is provided with openings 57 therethrough, each of which is adapted to receive a ball, the balls and the sleeve cooperating to lock the parts. The sleeve 56 has a circumferential flange 58 at the end and secured to said flange so as to overhang said openings 57 is a ring 59 against which the balls 54 abut when they extend through the openings 57 so that they are prevented from being forced completely out of the respective recesses. Secured to the end of the lock sleeve 56 as by screws 60 and mounted on the operating rod 5 is a collar 61 that is provided with a circumferential flange 62. The rod 5 has a shoulder 63 against which the collar ordinarily abuts. The outer face of said collar 61 is provided with a plurality of recesses 64 in each of which is disposed a coil spring 65 that projects therefrom, the projecting portion of each coil spring being disposed in a recess 66 provided therefor in a second collar 67 that is threaded on to the operating rod so as to be fixed thereto. The springs 65 tend to hold said collar 61 against the shoulder 63 on the rod 5. A suitable bushing 68 is threaded into the end of the bore of the fixed collar 67. The annulus 52 and the collars 61 and 67 are held in alinement by pins 69 passing therethrough. All of these members rotate with the spindle.

Slidably mounted on the locking sleeve 56 is an annular bearing member 70 that is provided with circumferential flanges 71 and 72 at each end. One flange member 72 may conveniently be made separate and secured to the bearing member as by being screwed thereon. Two series of balls 73 are mounted in the bearing member, one series adjacent to each flange. A sleeve 74 has its bore provided with a circumferential rib or flange 75 that is disposed in the space between the two series of balls 73. The sleeve is provided with oppositely disposed bolts 76 or studs projecting inwardly thereof, to each of which is secured a roller 77 that rides in a cam slot 78 that is provided therefor in a cam sleeve 79 that is secured to the frame member. Secured to the operating sleeve 74 is a suitable handle 80 for operating it.

In the position shown in Fig. 1, the chuck is closed, as above stated. The mechanism is locked by reason of the fact that the balls 54 extend into the holes 57 in the locking sleeve 56. In order to release or open the chuck, the operating sleeve 74 is moved to the right by means of the handle 80. The amount of movement of the operating sleeve is determined by the cam slots 78. The sleeve by pressing against the right hand series of balls 73, carries with it the bearing member which forces the locking balls 54 into their pockets. When the bearing member 70 strikes the ring 59 in the lock sleeve 56 said lock sleeve, the collars 61 and 67 and the operating rod are moved, the lock sleeve 56 pressing the balls 54 inward in their recesses. In open position, the parts are locked by means of the rollers 77 being disposed in the offset portions of the cam slots 78 after the manner of a bayonet joint. To close the chuck, the handle is moved to cause the operating sleeve 74 to move to the left (rear) and the rib 75 thereof presses against the left (rear) series of balls 73, thus carrying the bearing member 70 with it. When the bearing member 70 strikes the flange 62 of the collar 61, the collars 61 and 67 and the draw rod 5 are caused to move also, thus closing the work engaging fingers as hereinbefore described.

The roller bearing cones that are ground have ribs that vary somewhat in width, and the purpose of the springs 65 that are held in the collars 61 and 67 is to compensate for such variation. The collar 61 is capable of limited longitudinal movement on the operating rod. A cone whose rib is wider than the standard will force the collar off its seat against the pressure of the springs.

By this arrangement, the collar 61 normally moves with the draw rod 5, but is free to yield slightly when the size of the work requires.

The herein described chuck and operating mechanism have numerous advantages. The chuck is adapted to accurately center and hold annular articles of varying length and thickness. The articles may be inserted and removed while the chuck is rotating. A convenient knockout is provided for loosening the plug gage with which the cone is tested. The operating mechanism is likewise operable while the device is rotating and the ball bearings minimize the friction between the operating sleeve and the rotating parts.

Obviously, numerous changes might be made without departing from the invention, and I do not wish to be limited to the precise construction shown.

What I claim is:

1. A frame, a hollow spindle rotatably mounted therein, a chuck operating draw rod in the bore of said spindle, rotatable therewith and movable axially thereof, a flanged collar operatively connected with said rod to move it axially, a sleeve secured to said collar and having a circumferential flange at the end, a ring secured to said flange, a member slidable on said sleeve, said member engaging said flange on said collar as it moves in one direction and said ring on said sleeve flange as it moves in the other direction, thereby moving said collar and said draw rod, and means permitting limited relative longitudinal movement of said collar and said chuck operating rod.

2. A frame, a hollow spindle rotatably mounted therein, a chuck operating draw rod in the bore of said spindle, rotatable therewith and movable axially thereof, a flanged collar operatively connected with said rod to move it axially, a sleeve secured to said collar and having a circumferential flange at the end, a ring secured to said flange, a member slidable on said sleeve, said member engaging said flange on said collar as it moves in one direction and said ring on said sleeve flange as it moves in the other direction, thereby moving said collar and said draw rod, and means permitting limited relative longitudinal movement of said collar and said chuck operating rod, said means comprising a shoulder on said draw rod against which said collar abuts, a second collar fixed on said rod and springs interposed between said collars.

3. A frame, a hollow spindle rotatably mounted therein, a chuck operating draw rod in the bore of said spindle rotatable therewith and movable axially thereof, an annular member secured to the end of said spindle and provided with a circular series of radially disposed recesses, a ball in each of said recesses, a spring interposed between each ball and the end of its recess, a flanged collar mounted on said rod, a sleeve secured to said collar and overlapping said annular member, said sleeve having a circumferential flange at the end and having a series of holes adapted to receive said balls to lock said sleeve and annular member together, a ring secured to said flange and overhanging said holes, a member slidable on said sleeve, said member disconnecting said sleeve and annular member and engaging said flange on said collar as it moves in one direction and said ring on said sleeve flange as it moves in the other direction.

4. A frame, a hollow spindle rotatably mounted therein, a chuck operating draw rod in the bore of said spindle, rotatable therewith and movable axially thereof, an annular member secured to the end of said spindle and provided with a circular series of radially disposed recesses, a ball in each of said recesses, a spring interposed between each ball and the end of its recess, a flanged collar mounted on said rod, a sleeve secured to said collar and overlapping said annular member, said sleeve having a circumferential flange at the end and having a series of holes adapted to receive said balls to lock said sleeve and annular member together, a ring secured to said flange and overhanging said holes, a member slidable on said sleeve, said member disconnecting said sleeve and annular member and engaging said flange on said collar as it moves in one direction and said ring on said sleeve flange as it moves in the other direction, said slidable member having circumferential flanges at the ends, anti-friction balls disposed on said member adjacent to said flanges, an operating sleeve having a circular rib in the bore thereof disposed between said anti-friction balls, and means for moving said operating sleeve to move said slidable member axially, said antifriction balls permitting axial movement of said member while it is rotating.

5. In a device of the kind described, a hollow rotary spindle, a chuck operating rod in the bore of said spindle rotatable therewith and movable axially thereof, an annular member secured to said spindle, said annular member having a circular series of radially disposed recesses therein, a ball mounted in each of said recesses, a spring between each ball and the bottom of its recess, a collar operatively connected with said chuck-operating rod, a sleeve secured to said collar and fitting over said annular member, said sleeve having a circular series of openings adapted to receive said balls to lock said sleeve and said annular member together, and means disconnecting said sleeve and annular member and for moving said sleeve and chuck operating rod longitudinally without preventing rotation thereof.

6. In a device of the kind described, a hollow rotary spindle, a chuck operating rod in the bore of said spindle rotatable therewith and movable axially thereof, an annular member secured to said spindle, said annular member having a circular series of radially disposed recesses therein, a ball mounted in each of said recesses, a spring between each ball and the bottom of its recess, a collar operatively connected with said chuck-operating rod, a sleeve secured to said collar and fitting over said annular member, said sleeve having a circular series of openings adapted to receive said balls to lock said sleeve and said annular member together, means disconnecting said sleeve and annular member and for moving said sleeve and chuck operating rod longitudinally without preventing rotation thereof, and means permitting limited relative longitudinal movement of said collar and said chuck operating rod.

7. In a device of the kind described, a hollow rotary spindle, a chuck operating rod in the bore of said spindle rotatable therewith and movable axially thereof, an annular member secured to said spindle, said annular member having a circular series of radially disposed recesses therein, a ball mounted in each of said recesses, a spring between each ball and the bottom of its recess, a collar operatively connected with said chuck-operating rod, a sleeve secured to said collar and fitting over said annular member, said sleeve having a circular series of openings adapted to receive said balls to lock said sleeve and annular member together, means disconnecting said sleeve and annular member and for moving said sleeve and chuck operating rod longitudinally without preventing rotation thereof, and means permitting limited relative longitudinal movement of said collar and said chuck operating rod, said means comprising a shoulder on said rod against which the collar abuts, a second collar fixed on the rod and springs interposed between said collars said springs tending to seat said first collar against said shoulder on said rod.

Signed at Canton, Ohio, this 23d day of January, 1923.

OSWALD SCHLAUPITZ.